Patented Nov. 17, 1931

1,832,325

UNITED STATES PATENT OFFICE

LUDWIG ROSENSTEIN, OF SAN FRANCISCO, CALIFORNIA

PROCESS FOR REMOVING HYDROGEN SULPHIDE

No Drawing.  Application filed July 16, 1928. Serial No. 293,311.

This invention relates generally to processes for effecting removal of hydrogen sulphide or related sulphur compounds, from various substances. It has particular application for the removal of hydrogen sulphide from petroleum products which, as is well known, are mixtures of hydrocarbons.

In general it is an object of my invention to improve processes which utilize certain solutions in the treatment of substances for the removal of hydrogen sulphide. In such processes intimate contact between the treating solution and the substance being treated results in the formation of a sulphur compound which is removed from the substance being treated together with the alkaline solution. If the solution is to be re-used, it must be regenerated to free the solution of sulphur compounds such as soluble sulphides. It is characteristic of the presnt invention that elementary sulphur is immediately precipitated upon contacting the treating solution with the substance being treated, and subsequently the solution is regenerated or reactivated in a manner to be presently described.

My invention may be outlined briefly as utilizing a solution of a polythionate of an alkali metal. I prefer to modify this solution by the addition of buffer salt mixtures to affect the hydroxide ion concentration. Upon contacting this solution with the substance from which hydrogen sulphide is to be removed, such as a petroleum product, elementary sulphur is immediately precipitated. The solution together with the precipitated sulphur is then removed or separated from the petroleum product, and is regenerated or reactivated. The regeneration in my invention is effected by oxidation, as by bringing the solution in contact with air or oxygen. The elementary sulphur may be removed from the solution by any suitable means either before or after the regenerating step.

In practice the polythionate which I prefer to employ is a tetrathionate of an alkali metal. I have secured good results by the use of sodium tetrathionate. I have discovered that a polythionate such as sodium tetrathionate will not only react with hydrogen sulphide to effect precipitation of elementary sulphur, but that such solutions after reacting with hydrogen sulphide may be regenerated by oxidation. For example starting with a solution of sodium thiosulphate, or some soluble thiosulphate of an alkali metal, I have found that this solution may be oxidized by air to form sulphur compounds of a higher state of oxidation, such as sodium tetrathionate. When the oxidized solution is brought into contact with the substance being treated for removal of hydrogen sulphide, the sodium tetrathionate reacts rapidly and smoothly with hydrogen sulphide or related sulphur compounds to form elementary sulphur and to reduce the sodium tetrathionate to sodium thiosulphate. The reaction effected during oxidation of the sodium thiosulphate solution may be written as follows:

Equation 1

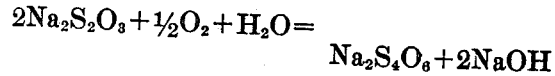

When the above solution after the oxidizing treatment is caused to combine with hydrogen sulphide or related compounds, the sodium tetrathionate ($Na_2S_4O_6$), reacts with the hydrogen sulphide ($H_2S$) as represented by the following:

Equation 2

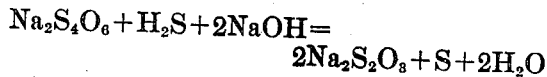

It will be noted from the above equations that sodium hydroxide (NaOH) is one of the products produced upon oxidizing the sodium thiosulphate. I have discovered that sodium tetrathionate is very unstable in the presence of a strong alkali or in a solution in which the hydroxide ion concentration is above a certain value as, for example $10^{-3}$ molal OH$^-$ ion. I have found however that the hydroxide ion concentration may be kept below this value and thereby the sodium tetrathionate solution made stable by using certain buffer salts or salt mixtures. These buffer salts serve to react with the sodium hydroxide. For example for this purpose I prefer to employ sodium bicarbonate (NaHCO₃) which reacts with the sodium hydroxide as follows:

*Equation 3*

$$NaOH + NaHCO_3 = Na_2CO_2 + H_2O$$

In addition to the use of sodium bicarbonate and carbonate, other buffer salts or buffer salt mixtures may be employed such as the acid sodium phosphates ($Na_2HPO_4$) and ($NaH_2PO_4$). As indicated by the above equation 3, these buffer salts or buffer salt mixtures when added to my solution serve to react with the alkali produced by Equation 1, and thereby serve to keep the hydroxide ion concentration below a value above which the sodium tetrathionate would become unstable.

It will be obvious to those skilled in the art, that since the process is conducted in an alkaline solution, that the concentration of OH⁻ ion does not decrease below $10^{-7}$ molal, and that therefore the operable limits of OH ion concentration are between concentrations of $10^{-3}$ and $10^{-7}$ molal.

After the substance to be treated has been contacted with my solution, which it will be presumed is a solution of sodium tetrathionate and one or more buffer salts, elementary sulphur (S) is immediately precipitated as indicated in Equation (2) and the sodium tetrathionate is reduced to the original thiosulphate. I have found that a sufficiently rapid oxidation of this solution to reform sodium tetrathionate as is desired in commercial practice cannot be produced by simply contacting with air. However I have discovered that by the use of certain catalysts, such a reaction can be caused to take place so as to render the process commercially practical. As catalysts to aid in this reaction I have found that good results can be obtained by the use of small amounts of salts of nickel or cobalt, preferably insoluble salts such as sulphides of these metals. As is well known, nickel and cobalt are essentially divalent elements of the eighth group of the periodic system. While nickel and cobalt compounds are the preferred catalysts, I may employ other materials such as activated carbon.

Instead of effecting oxidation of the treatment solution as explained above, the solution can be oxidized by electrolysis. For example an electrical current is passed thru the solution to effect a reaction as follows:

*Equation 4*

$$2S_2O_3^= + 2 \oplus = S_4O_6^=$$

When electrolysis is employed, I prefer to form the anode of nickel.

Although it is to be understood that the invention is not limited to the following specific example, for completeness it may be explained that the process can be carried out as follows: A solution containing 18 grams per liter of sodium thiosulphate and 28 grams per liter of sodium bicarbonate is brought into contact with air in a suitable apparatus and in the presence of a catalyst, for example 1 gram per liter of suspended nickel sulphide. The contact with air is continued until that amount of sodium tetrathionate has been formed sufficient to react with the hydrogen sulphide to be present in the next stage of the process. The solution is then brought into intimate contact with the gas or liquid or other substance containing the hydrogen sulphide, as for example a petroleum product, whereby the sulphide is absorbed with the immediate formation of sulphur. The solution, which is now free or contains a greatly reduced amount of tetrathionate, or which may even contain traces of sulphide, is now returned to the beginning of the cycle. The elementary sulphur formed by the reaction of the sulphide with the solution may be removed by any suitable separating process, as by filtration, although I have found that a certain amount thereof if kept in the solution during the cycle of my process is not detrimental but in fact benefits the process in that it aids the oxidation of the solution with air. I therefore prefer to keep a small percentage of elementary sulphur suspended in the solution.

Although in the above example I have indicated that the process proceeds by certain steps, these steps need not be clearly defined in practice since the process operates advantageously when the removal of the sulphur compounds and the regeneration of the tetrathionate proceeds practically simultaneously. Thus the process can be operated continuously by introducing a sulphur compound containing hydrocarbon mixture into contact with the solution while blowing air through the whole mass. The liberated sulphur and refined hydrocarbon mixture can be drawn off continuously and fresh mixture admitted continuously to take the place of that withdrawn.

The process has given good results and is particularly adapted for the removal of hydrogen sulphide from petroleum products. As is well known certain petroleum products, particularly those resulting from the oil cracking process, may have a relatively high percentage of hydrogen sulphide which must be removed in order to render such products marketable. Not only is the process highly effective in the removal of hydrogen sulphide, but the removal is effected without injury to the petroleum product. The product being treated may be either in the gaseous or liquid state.

I claim:

1. In a process of removing sulphur compounds related to hydrogen sulphide from a material, the step of contacting the material with an alkaline solution containing, as substantially the only active ingredient, a tetrathionate.

2. In a process of removing sulphur compounds related to hydrogen sulphide from a material, the step of contacting the material with an alkaline solution containing, as substantially the only active ingredient, a tetrathionate of an alkali metal.

3. In a process of removing sulphur compounds related to hydrogen sulphide from a material, the step of contacting the material with an alkaline solution containing, as substantially the only active ingredient a tetrathionate, the solution being buffered to preserve a substantially constant hydroxide ion concentration whereby the tetrathionate is stabilized.

4. In a process of removing sulphur compounds related to hydrogen sulphide from a material, the steps of contacting the material with a solution containing a tetrathionate, and then reforming the tetrathionate by oxidation.

5. In a process of removing sulphur compounds related to hydrogen sulphide from a material, the steps of contacting the material with a solution containing a tetrathionate to directly precipitate sulphur, and then reforming the tetrathionate in the presence of a catalyst.

6. In a process of removing sulphur compounds related to hydrogen sulphide from a material, the steps of forming a tetrathionate in a solution of a thiosulphate, contacting the solution with the material, and then oxidizing the solution to reconvert the thiosulphate to tetrathionate.

7. In a process of removing hydrogen sulphide and related compounds from a material by contacting the same with a solution of a tetrathionate, the step of regenerating a solution containing, as the principal constituent thereof, a thiosulphate by contacting the solution with an oxidizing agent to convert thiosulphate to tetrathionate.

8. In a process of removing hydrogen sulphide and related compounds from a material by contacting the same with a solution of tetrathionate comprising regenerating a solution containing, as the principal constituent thereof, a thiosulphate by contacting the solution with air to convert thiosulphate to tetrathionate.

9. In a process of removing hydrogen sulphide and related compounds from a material by contacting the same with a solution of tetrathionate, the step of generating tetrathionate in a solution containing thiosulphate by contacting the solution with an oxidizing agent in the presence of a catalyst.

10. In a process of removing hydrogen sulphide and related compounds from a material by contacting the same with a solution of tetrathionate; the step of generating tetrathionate in a solution containing thiosulphate by contacting the solution with air in the presence of a catalyst.

11. In a process of removing hydrogen sulphide and related compounds from a material by contacting the same with a solution of a tetrathionate; the step of generating tetrathionate in solution containing thiosulphate by contacting the solution with air in the presence of a cataylst consisting of a sulphide substantially insoluble in the solution.

12. In a process of removing hydrogen sulphide and related compounds from a material by contacting the same with a solution of a tetrathionate; the step of generating tetrathionate in a solution containing thiosulphate by contacting the solution with air in the presence of nickel sulphide.

13. In a process of removing hydrogen sulphide and related compounds from a material by contacting the same with a solution of a tetrathionate; the step of generating tetrathionate in a solution containing thiosulphate by contacting the solution with an oxidizing agent in the presence of a cataylst consisting of a compound of a divalent element of the eighth periodic group.

14. In a process of removing hydrogen sulphide and related compounds from a material by contacting the same with a solution of a tetrathionate, the step of generating tetrathionate in a solution containing thiosulphate and dissolved sulphide by contacting the solution with an oxidizing agent until the dissolved sulphide has substantially disappeared.

15. In a process of removing hydrogen sulphide and related compounds from a material by contacting the same with a solution of a tetrathionate, the step of generating tetrathionate in a solution containing thiosulphate and dissolved sulphide by contacting the solution with an oxidizing agent until the dissolved sulphide has substantially disappeared and continuing the generation to increase tetrathionate concentration.

16. In a process of removing sulphur compounds related to hydrogen sulphide from a material, the step of contacting the material with a solution containing as substantially the only active ingredient, a tetrathionate.

17. In a process of removing sulphur compounds related to hydrogen sulphide from a material, the step of contacting the material with a solution containing, as substantially the only active ingredient, a tetrathionate, the solution being buffered to preserve a substantially constant hydroxide ion concentration whereby the tetrathionate is stabilized.

In testimony whereof, I have hereunto set my hand.

LUDWIG ROSENSTEIN.